Patented Apr. 8, 1941

2,237,762

UNITED STATES PATENT OFFICE 2,237,762

STEROL DERIVATIVES AND PROCESS OF MAKING SAME

Russell Earl Marker, State College, Pa., assignor to Parke, Davis & Company, Detroit, Mich., a corporation of Michigan No Drawing. Application March 12, 1937, Serial No. 130,581. Renewed March 27, 1940

7 Claims. (Cl. 260—397)

The invention relates to production of new sterol derivatives and more particularly to a method for the preparation of reduction products of 7-keto-cholesteryl halides and derivatives thereof.

In copending application Serial No. 130,583 filed of even date herewith 7-keto-cholesteryl halides, such as 7-keto-cholesteryl chloride, are described.

I have now found that a 7-keto-cholesteryl halide can be reduced to the corresponding 7-hydroxy cholestyl halide which, by further reduction, gives 7-hydroxy cholestane capable of oxidation to 7-keto-cholestane.

In one way of reducing a 7-keto-cholesteryl halide to 7-hydroxy cholestyl halide in accordance with the invention, a direct and complete catalytic hydrogenation is used. In another variation the keto-halide, e. g. 7-keto-cholesteryl chloride, is first partially reduced without use of hydrogen gas to 7-hydroxy cholesteryl chloride and this intermediate then further reduced at its unsaturated double bond to give 7-hydroxy cholestyl chloride. However, regardless of whether direct one-step reduction is used, or whether reduction by way of 7-hydroxy cholesteryl halide is used, it has been found that $\alpha$-cholestyl halide is also produced as a second product of the final reduction. This is remarkable since the original 7-keto-group has thereby been completely reduced and epimerization has also occurred at the number 3 carbon atom. Another compound of the invention, which may also be considered as a reduction product of a 7-keto-cholesteryl halide, is a 7-keto-cholestyl halide, such as 7-keto-cholestyl chloride. This latter compound is made, for example, by oxidizing the 7-hydroxy group of 7-hydroxy-cholestyl chloride mentioned above to a keto group.

The following examples serve to further illustrate the invention.

*7-keto-cholesteryl chloride from cholesteryl chloride.*—To a solution of 203 g. of cholesteryl chloride in 3500 cc. of acetic acid kept at 55° is added with stirring over a one-hour period a solution of 150 g. of chromic oxide in 100 cc. of water and 100 cc. of glacial acetic acid. The solution is stirred during an additional two hours. Ethyl alcohol is added and the reaction mixture concentrated under reduced pressure at 55° to a volume of 1.5 liters. To this is added 100 cc. of water and the mixture is cooled over night. The crystalline material is filtered, washed with 600 cc. of alcohol followed by 300 cc. of acetone and is finally crystallized from acetone. The 7-keto-cholesteryl chloride thus obtained has a melting-point of 145°. Yield 50 g. The melting-point of the semi-carbazone is 176°.

Analysis calculated for $C_{27}H_{43}OCl$: C, 77.4; H, 10.3. Found: C, 77.8; H, 10.2.

Analysis calculated for $C_{28}H_{46}OClN_3$: C, 70.7; H, 9.7. Found: C, 70.5; H, 10.0.

*Reduction of 7-keto-cholesteryl chloride with platinum oxide catalyst.*—To a solution of 5 g. of 7-keto-cholesteryl chloride dissolved in 200 cc. of glacial acetic acid there is added 1.5 g. of platinum oxide. The mixture is shaken with hydrogen under a pressure of 45 pounds for 6 hours when the catalyst is filtered off and the acetic acid distilled under reduced pressure. The residue is crystallized from alcohol, m. 114.5°. Mixed with $\alpha$-cholestyl chloride, m. 114°, it gives no depression in melting-point.

Analysis calculated for $C_{27}H_{47}Cl$: C, 79.6; H, 11.6. Found: C, 79.6; H, 11.6.

The mother liquors from the above reduction contain about 80 per cent of a product which will not crystallize and which is not cholestyl chloride, since that product is almost completely insoluble in cold alcohol. The subsequent examples, however, prove that these mother liquors contain 7-hydroxy-cholestyl chloride.

*7-keto-cholestyl chloride.*—The solvent from the mother liquors in the previous example are evaporated. To 2 g. of the residue there is added 20 cc. of acetic acid and a solution of 0.7 g. of chromic oxide in 3.4 cc. of acetic acid. The reaction mass is kept at 50–60° for 2 hours, then allowed to stand over night at room temperature. A crystalline product separates out and is filtered off and recrystallized from alcohol, m. 139°.

Analysis calculated for $C_{27}H_{45}OCl$: C, 77.1; H, 10.7. Found: C, 77.1; H, 10.6.

*Cholestanol-7.*—To 6 g. of crude 7-hydroxy-cholestyl chloride in 175 cc. of dry boiling amyl alcohol there is added 12.5 g. of sodium. When the reaction is complete water is added and the alcoholic layer separated and evaporated under reduced pressure. The residue crystallizes from alcohol in needles melting at 117.5°.

Analysis calculated for $C_{27}H_{48}O$: C, 83.5; H, 12.4. Found: C, 83.4; H, 12.3.

*Cholestanone-7.*—To a solution of 2 g. of 7-hydroxy-cholestane in 35 cc. of acetic acid there is added 0.7 g. of chromic oxide in 4 cc. of acetic acid. The product is kept at 50° for 4 hours and then allowed to stand at room temperature for an additional 24 hours. Water is then added and the oxidation product extracted with ether. The ether solution is washed with sodium carbonate solution, the ether evaporated, and the residue crystallized from acetone, m. 117°. Mixed with 7-hydroxy-cholestane m. 117° it gives a depression of 10° in melting-point.

Analysis calculated for $C_{27}H_{46}O$: C, 83.9; H, 12.0. Found: C, 84.3; H, 12.1.

*7-hydroxy-cholesteryl chloride.*—To a solution of 40 g. of 7-keto-cholesteryl chloride (m. 145°) in 510 cc. of dry isopropyl alcohol there is added 30 g. of distilled aluminum isopropylate. The mixture is refluxed for 5 hours after which 250 cc. of isopropyl alcohol is distilled off over a period of 4 hours. The residue is poured into 1300 cc. of 3 percent potassium hydroxide solution and shaken vigorously. The product is extracted with ether, the solvent concentrated to 100 cc. and 100 cc. of acetone added. Crystals separate on cooling which are recrystallized from acetone. Yield 31 g., m. 142°.

Analysis calculated for $C_{27}H_{45}OCl$: C, 77.1; H, 10.7. Found: C, 77.0; H, 10.8.

*Hydrogenation of 7-hydroxy-cholesteryl chloride.*—To a solution of 1.2 g. of 7-hydroxy-cholesteryl chloride in 120 cc. of acetic acid there is added 400 mg. of platinum oxide. The mixture is shaken for 4 hours with hydrogen at 45 pounds pressure and the solution filtered and concentrated. The residue is crystallized from acetone, m. 115°. Mixed with α-cholestyl chloride it gives no depression in melting-point.

Analysis calculated for $C_{27}H_{47}Cl$: C, 79.6; H, 11.6. Found: C, 79.7; H, 11.7.

The mother liquors from the above example are evaporated to dryness, the residue dissolved in 15 cc. of glacial acetic acid at 50°, and 0.2 g. of chromic oxide in 2 cc. of acetic acid added. After maintaining the solution at 50° for 4 hours it is kept at room temperature for an additional 15 hours. Water is then added, the product extracted with ether, the ether evaporated, and the residue crystallized from alcohol, m. 137°. Mixed with 7-keto-cholestyl chloride previously prepared, it gives no depression in melting-point. This shows that the mother liquors contain 7-hydroxy-cholestyl chloride.

Analysis calculated for $C_{27}H_{45}OCl$: C, 77.1; H, 10.7. Found: C, 77.1; H, 10.9.

*Benzoate of 7-hydroxy-cholesteryl chloride.*—A solution of 22.6 g. of 7-hydroxy-cholesteryl chloride in 150 cc. of dry pyridine is cooled in ice and 50 cc. of benzoyl chloride added in small portions with shaking. The solution is allowed to stand at room temperature for 2 days after which it is poured into 4 liters of water and allowed to stand over night. The water is decanted and the residue dissolved in ether, the ether solution being washed with sodium carbonate solution after which is is concentrated to 100 cc. and 200 cc. of methyl alcohol added. After standing over night, crystals form which are recrystallized from acetone. Yield 11 g., m. 119°.

Analysis calculated for $C_{34}H_{49}O_2Cl$: C, 77.91; H, 9.4. Found: C, 78.2; H, 9.6.

The transformations involved in the above examples may be further illustrated by the following formulas and diagrams.

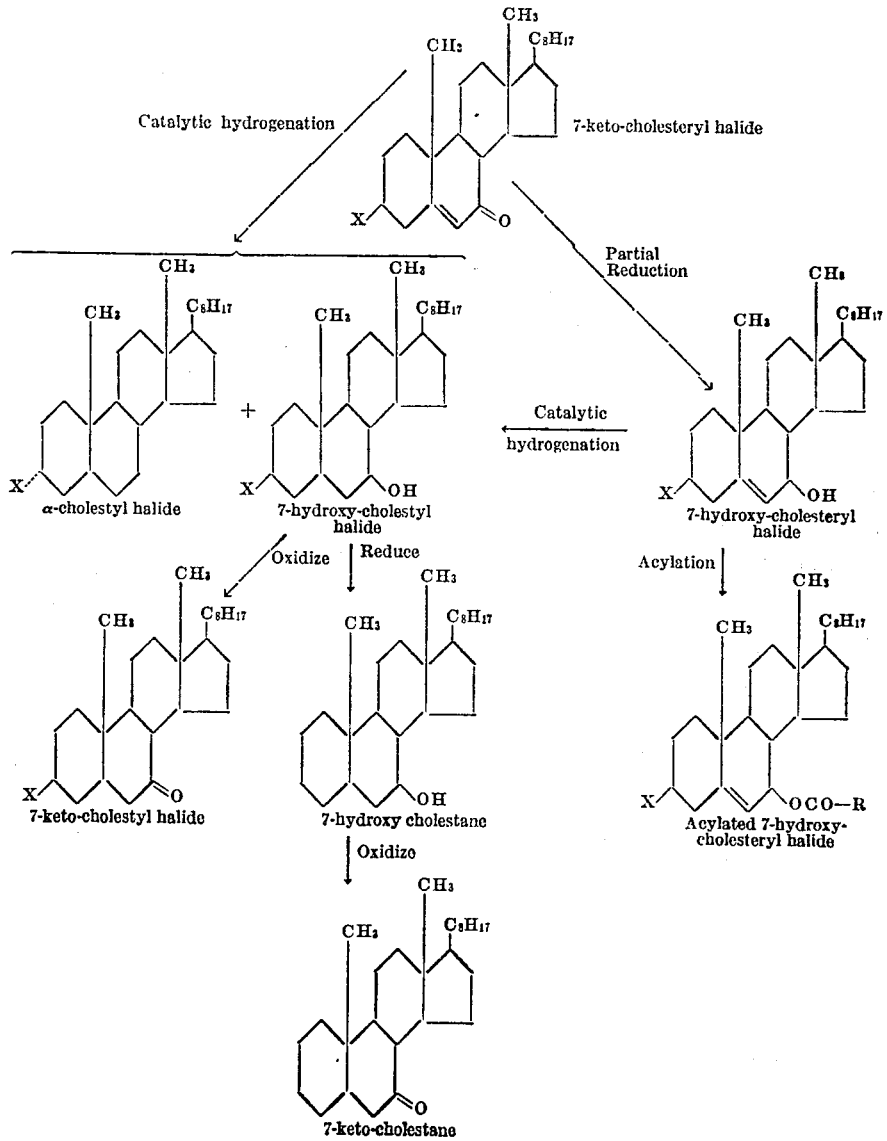

The invention is not limited to the examples given, since many variations are possible without departing from the spirit of the invention as specified in the appended claims. For example, although the examples refer to 3-chloro-compounds, the invention is not limited to these, but other equivalent 3-halogeno-compounds can also be substituted for the chloro-compounds. Moreover, it is obvious that instead of using benzoyl chloride as described above in the preparation of the acylated 7-hydroxy-cholesteryl chloride, any other acylating agent of the same type may be used.

Certain subject matter disclosed but not claimed in the instant application is claimed in my divisional application, Serial No. 214,842, filed June 20, 1938.

What I claim as my invention is:

1. Process for the preparation of 7-keto-cholestane which comprises reducing a 7-keto-cholesteryl halide to 7-hydroxy cholestyl halide, reducing the latter compound to 7-hydroxy cholestane and oxidizing the 7-hydroxy cholestane to 7-keto cholestane.

2. In a process for the preparation of 7-keto-cholestane from a 7-keto-cholesteryl halide, the steps which comprise reducing the 7-keto-cholesteryl halide to its 7-hydroxy cholestyl halide and further reducing the latter compound to 7-hydroxy-cholestane.

3. In the reduction of 7-keto-cholesteryl chloride the steps which comprise reduction of said chloride to a mixture of α-cholestyl chloride and 7-hydroxy-cholestyl chloride, crystallizing the α-cholestyl chloride from the mixture in an organic solvent, separating the crystals of α-cholestyl chloride from the solution of 7-hydroxy-cholestyl chloride, and reducing the latter compound to 7-hydroxy-cholestane.

4. A 7-hydroxy cholestyl halide.

5. 7-hydroxy cholestyl chloride.

6. The steps which comprise reducing a 7-keto-cholesteryl halide to 7-hydroxy-cholestyl halide with a reducing agent which does not affect the halogen of said halides and thereafter reducing the 7-hydroxy-cholestyl halide with a reducing agent which is capable of affecting the halogen and replacing it by hydrogen.

7. The step which comprises reducing a 7-keto-cholesteryl halide to 7-hydroxy-cholestyl halide with a reducing agent which does not affect the halogen of said halides.

RUSSELL EARL MARKER.